April 20, 1971
M. H. BROWN
3,575,817
MULTIEFFECT DISTILLATION PROCESS AND SYSTEM
WITH DOWNWARD REMOVAL OF VAPOR
Filed March 7, 1969
3 Sheets-Sheet 1
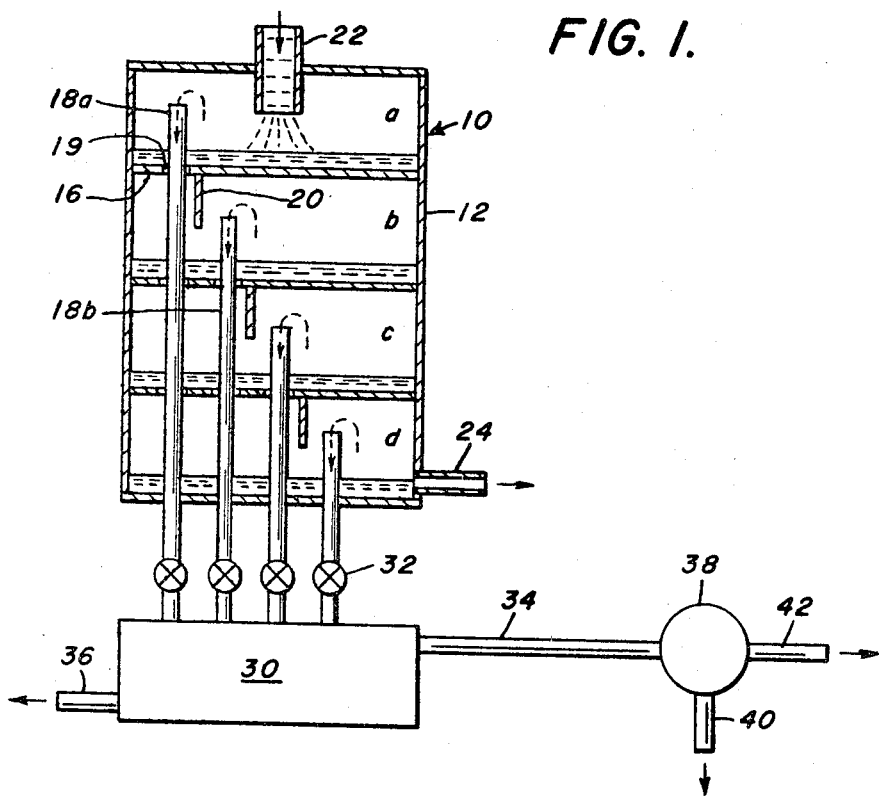
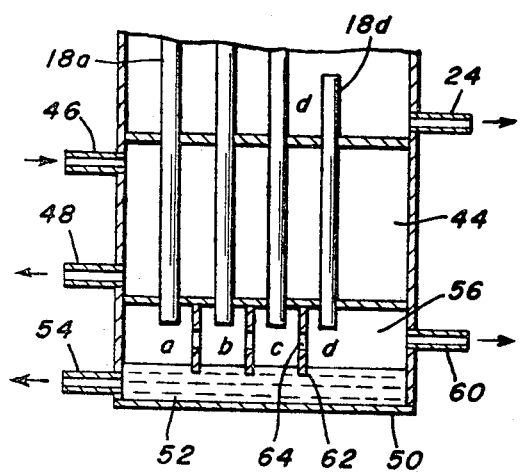
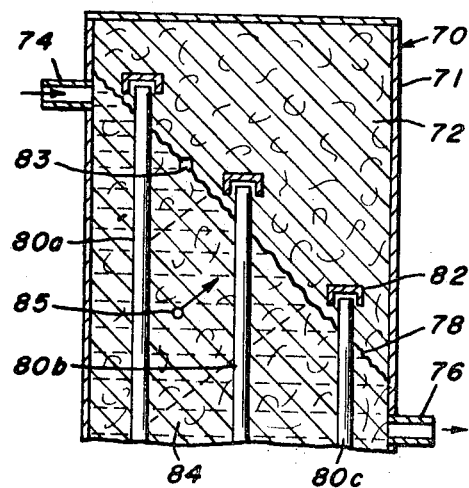
INVENTOR.
MELVIN H. BROWN
By Carl R. Lippert
Attorney

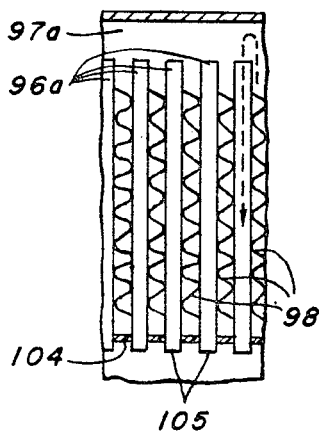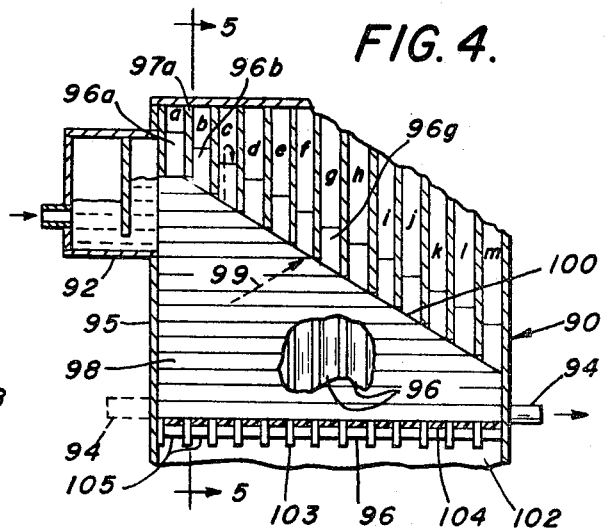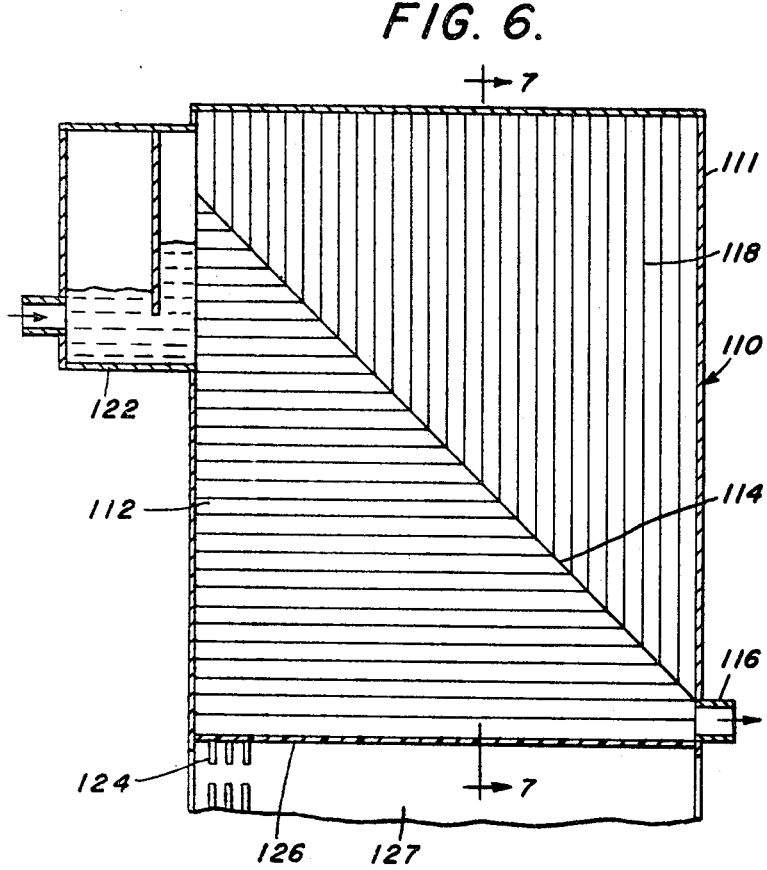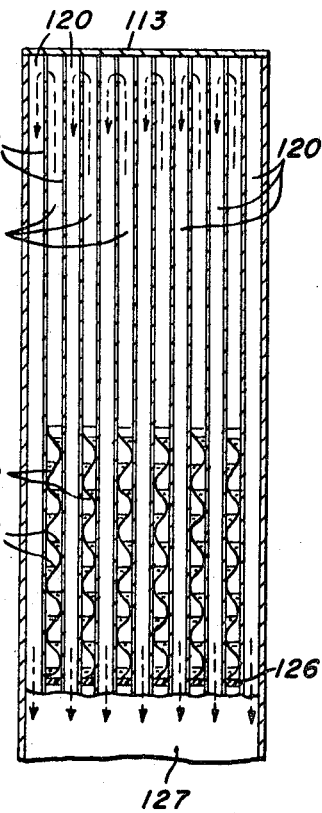

April 20, 1971
M. H. BROWN
3,575,817
MULTIEFFECT DISTILLATION PROCESS AND SYSTEM
WITH DOWNWARD REMOVAL OF VAPOR
Filed March 7, 1969
3 Sheets-Sheet 3
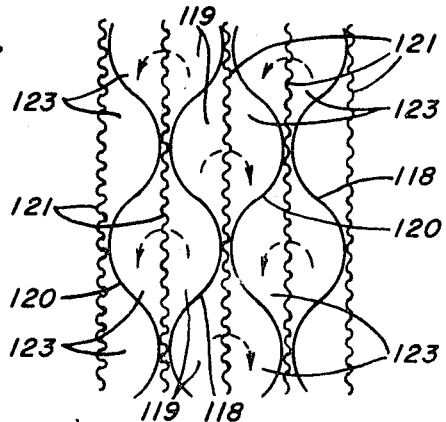
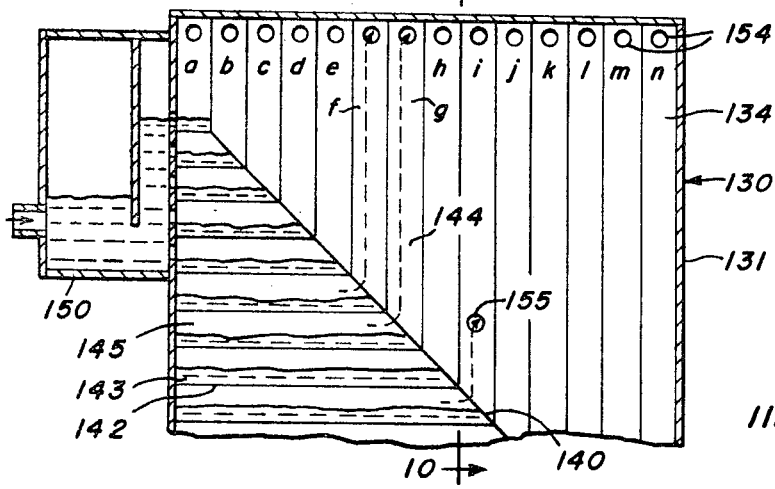
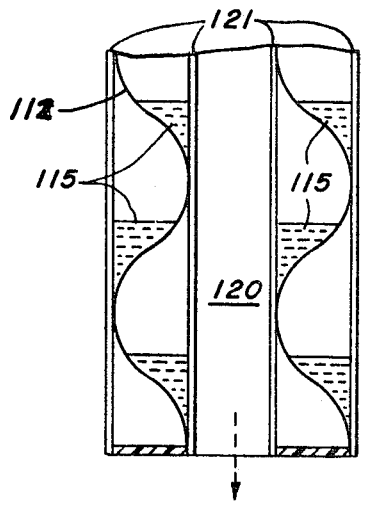
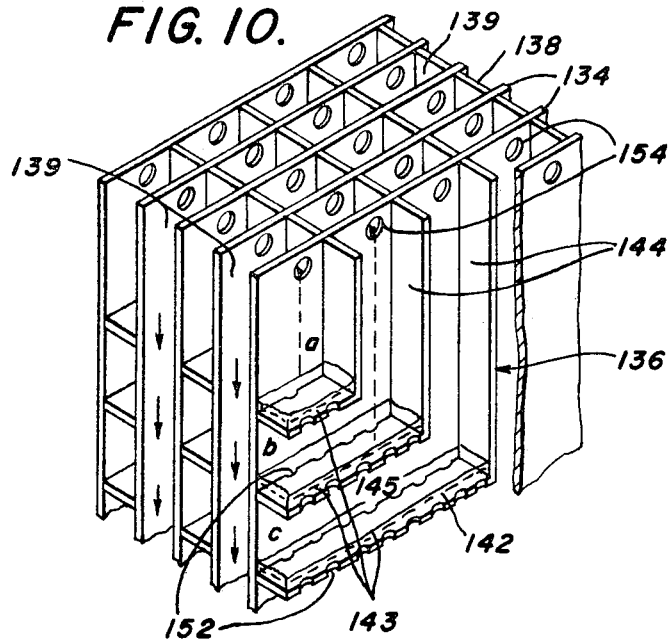
INVENTOR.
MELVIN H. BROWN
By Carl R Lippert
Attorney United States Patent Office 3,575,817
Patented Apr. 20, 1971

3,575,817
MULTIEFFECT DISTILLATION PROCESS AND SYSTEM WITH DOWNWARD REMOVAL OF VAPOR
Melvin H. Brown, Leechburg, Pa., assignor to Aluminum Company of America, Pittsburgh, Pa.
Filed Mar. 7, 1969, Ser. No. 805,195
Int. Cl. B01d 3/10
U.S. Cl. 203—11      10 Claims

ABSTRACT OF THE DISCLOSURE

A portion of an impure liquid is evaporated and the vapor condensed to provide a purified liquid product such as purified water. Evaporation is effected by a process employing a plurality of evaporate zones. According to the new arrangements, evaporation is effected in a plurality of zones and the vapor removed downwardly through elongate chambers. A downwardly decreasing thermal gradient is established in the unevaporated liquid by properly controlling the pressures in the evaporative zones. Heat is removed from the vapor as it is moved downwardly through this temperature gradient.

BACKGROUND OF THE INVENTION

There are a number of processes where a portion of a liquid is evaporated to produce a vapor with the unevaporated portion of the liquid exiting at a lower temperature than that at which it entered the system. The vapor is condensed to produce a purified version of the liquid. In order to prompt evaporation, the pressure in the evaporator is maintained at a level below the saturation pressure for the liquid. There have been proposed both single stage and multistage evaporative schemes in which latter case the heat for condensing the vapor from one stage is removed as the heat of vaporization in the next stage. In most of the multistage effects, several vessels are employed and countercurrent liquid-vapor flow is utilized. One example of such a process occurs in the evaporation of sea water, or other water containing impurities, with condensation of the vapor to produce purified water. Both multistage and single stage evaporators have been proposed for this application but both have disadvantages.

STATEMENT OF THE INVENTION

Incoming impure feed liquid is passed through a plurality of evaporative zones, each successive zone being situated beneath its preceding zone. A portion of the liquid passing through each zone is evaporated to produce a vapor and leave an unevaporated liquid portion at a reduced temperature. The relative pressures in the successive zones are maintained at steadily decreasing levels to effect steadily decreasing pressure and temperature gradients proceeding downwardly through the successive evaporative zones. The vapor formed in each zone is moved downwardly within an elongate chamber which passes through and in heat transfer relation with the unevaporated liquid which exhibits a downwardly decreasing temperature. This heat exchange causes condensation from the vapor on the inside of the chambers together with some heating and evaporation of the liquid on the outside of the chambers.

When referring herein to a liquid containing impurities, the term "impurities" is intended to encompass anything other than the liquid itself which might be contained therein. Examples are dissolved or undissolved inorganic or organic salts, minerals, or the like. Even though these ingredients may themselves have some value and might not be considered "impurities" in certain applications, for purposes of this discussion, they are considered impurities since their composition varies from that of the incoming carrier liquid. For instance, sea water contains many valuable minerals which, insofar as any purified water product is concerned, are considered to be impurities. In connection with sea water, it might be mentioned that the practice of the invention is particularly suited to the purification of saline or other brackish water.

DESCRIPTION

As this description proceeds, reference is made to the drawings in which:

FIG. 1 is an elevation view illustrating one embodiment of the invention.

FIG. 2 is an elevation view depicting a feature which may be added to the embodiment of FIG. 1.

FIG. 3 is an elevation view depicting another embodiment of the invention.

FIGS. 4 and 5 are elevation views illustrating another embodiment of the invention.

FIGS. 6 and 7 are also elevation views illustrating another embodiment of the invention.

FIG. 7a is an enlarged fragmentary view of a portion of FIG. 7.

FIG. 8 is an enlarged fragmentary plan view of the embodiment shown in FIGS. 6 and 7.

FIG. 9 is an elevation illustrating yet another embodiment of the invention.

FIG. 10 is a partial isometric view of the embodiment shown in FIG. 9.

Referring to FIG. 1, the evaporator 10 is shown having a chamber 12 which houses several evaporative zones one above the other although only four such zones, "a" through "d," are shown in FIG. 1. For each zone there is provided a tray 16 and one or more elongate vapor outlet chambers 18. Liquid feed enters through inlet 22 and exits through outlet 24. The incoming liquid for the first zone is distributed over the uppermost of trays 16. By controlling the pressure within elongate chamber 18a, the pressure in the space above the liquid is maintained at a level below the saturation pressure corresponding to the temperature of the liquid. This causes a portion of the liquid to evaporate and form a vapor which is then passed downwardly through elongate chamber 18a. The unevaporated portion of the liquid is cooled to a lower temperature by the evaporation in zone "a" and is continuously passed to the second evaporative zone "b." This may be accomplished by providing in the tray an orifice which is slightly larger than the exterior of the elongate chamber 18a. This results in a gap 19 around the elongate chamber which permits the unevaporated water to fall down the outside of elongate chamber 18a into the second evaporate zone "b." As in the first zone, zone "a," the pressure in zone "b" is maintained at a level below the saturation pressure of the liquid in zone "b." The resulting evaporation produces a vapor which is removed by passing downwardly through elongate chamber 18b.

As the unevaporated liquid, cooled by the evaporation in zone "a," passes along the outside of elongate chamber 18a, it extracts heat from the vapor inside the chamber. This results in a condensation of vapor in elongate chamber 18a together with some heating of the liquid running down the outside of chamber 18a and lying on tray 16b in evaporative zone "b." Like effects occur in subsequent zones through which chamber 18a passes. Baffles 20 prevent liquid running down the outside of higher chambers 18 from splashing laterally and into the entrances of lower chambers 18, for example, liquid running down chamber 18a is prevented by baffle 20a from splashing and entering the top of chamber 18b.

By controlling the pressures in the respective zones in steadily decreasing fashion proceeding downwardly through the successive zones, evaporation is caused to continue in each zone. This pressure control results in a steadily decreasing temperature gradient proceeding downwardly from zone to zone. The proper pressure for each respective zone can be maintained by controlling the pressure within the elongate chambers 18. This can be conveniently effected by providing a low pressure discharge chamber 30 into which the elongate chambers 18 from the respective zones exit and by controlling the pressure in the respective elongate chambers by any suitable pressure drop control means such as throttle valves 32. The discharge chamber 30, of course, is maintained at a pressure at least as low as that in the final zone, zone "d" in FIG. 1. Chamber 30 can be provided with an outlet 34 for the uncondensed vapor and any noncondensible gases emerging from the elongate chambers 18. Another outlet 36 is provided to remove the liquid condensed within the elongate chambers 18. The gases exiting the discharge chamber through outlet 34 may be cooled to effect condensation from the remaining vapor by passing it through a condensing means 38 out of which extends a condensate exit 40 and a residual gas exit 42 mainly for noncondensable gases. While only four evaporation zones are shown in FIG. 1, such is certainly not a limit on the invention which also contemplates employment of either a lesser or a greater number of zones.

The optimum differential pressure relation proceeding from evaporation zone to zone may be determined by trial for a particular application. In some cases, the total pressure differential across all the zones will be fixed and this may be divided equally among the zones. Another factor may be that the total temperature differential between the incoming impure water and the cooler exiting unevaporated portion thereof may be fixed and this can then determine the total pressure differential that is most useful. While equal increments from zone to zone usually provide the most convenient starting point, separate adjustments often can advantageously be made for each individual case.

It is important in practicing the invention that a downwardly decreasing temperature gradient be maintained from zone to succeeding zone in the liquid on the outside of the elongate vapor removal chambers, 18 in FIG. 1. While the primary influence here is the pressure gradient described above, the liquid should be conducted from evaporative zone to zone in a manner which permits it to respond to the pressure gradient in order to establish and maintain in the unevaporated liquid the desired downwardly decreasing temperature gradient. A number of factors are significant in this respect. The liquid must pass to each zone if all the zones are to function properly. Also, the liquid movement should not interfere with maintaining, in each zone, a pressure lower than that in the preceding zone. The amount of vapor moving downwardly in association with the downward liquid movement should be minimal. In some of the arrangements shown, it may be desirable to make some provision for adjusting the relative liquid flow from zone to zone. For instance, in the FIG. 1 arrangement, it becomes apparent that there are twice as many paths going from the second to third zone as there are going from the first to second zone. Accordingly, in order to keep all the trays flooded, it may be desirable to provide larger gaps around elongate chambers 18a than around chambers 18b. However, in most embodiments, this will not be necessary unless a very large number of zones is situated within a single enclosure. The liquid should facilitate something of a seal between adjacent stages. For instance, referring to FIG. 1, it can be seen that gap 19 provides a leak path between adjacent zones but this path, insofar as vapor movement is concerned, is sealed off by the liquid. This, then, permits isolation of one zone with respect to the adjacent zone to facilitate maintaining different pressures in each zone. In addition, as the liquid is moved from zone to zone, it should not obstruct the movement of vapor away from the liquid and especially it should not carry substantially any vapor downwardly.

As mentioned earlier, there is some heating of the liquid as it extracts heat from the vapor moving down within the elongate chambers. However, the extent of this heat input is not so great as to offset the downwardly decreasing temperature gradient. This heating merely serves to aid the evaporation which occurs in each zone and which results in a decrease in the liquid temperature notwithstanding the heat input.

Referring now to FIG. 2, there is shown a variation of the scheme generally depicted in FIG. 1. Here the elongate chambers 18 emerge from last evaporative zone "d" and are passed through a cooling chamber 44 where a cooling media, entering through nozzle 46 and exiting through nozzle 48, is circulated around the exteriors of the chambers 18. This can serve to condense substantially all the vapor remaining in the chambers 18 below the last evaporative zone. As the elongate chambers 18 emerge from chamber 44, they enter low pressure chamber 50. The condensate emerging from the tubes collects at the bottom of the chamber as a body of liquid 52 which is continually removed through drain 54. Above the liquid 52 are provided a series of low pressure zones 56 each corresponding to the elongate chambers associated with an evaporative zone. Thus, referring to the FIG. 1 embodiment which includes four evaporative zones, "a" through "d," there are provided in chamber 50 four low pressure zones, "a" through "d." The respective pressure levels for each zone, which in turn determine the relative pressures in the associated chambers 18 and their respective evaporative zones, can be controlled by providing a residual gas exit 60 connected to a means for maintaining the desired low pressure, e.g. a vacuum pump, where operating below atmosphere pressure. Separating each zone from its adjacent zone in chamber 50 is a partition or separator wall 62 having a variable size orifice 64. By maintaining a constant residue gas exit flow through exit 60 and manipulating the variable orifice in each separator wall 62, the pressures in the respective low pressure zones "a" through "d" in chamber 50 are maintained at desired levels and in steadily decreasing fashion proceeding from zone "a" to zone "d." This, in turn, maintains pressure levels in the respective evaporative zones "a" through "d" in likewise steadily decreasing fashion to produce in each zone evaporation of a significant portion of the liquid entering that zone to produce a vapor and a decrease in the temperature of the unevaporated portion of the liquid which then is passed out of each respective zone. The level of the liquid 52 is maintained above the bottom edge of the separator walls 62 to effect a seal between adjacent zones. Where the pressure differential between adjacent zones is rather high, the separator walls 62 desirably extend to the bottom and a separate condensate removal outlet is provided for each zone.

While the description to this point has referred to discrete evaporative zones which can be viewed as discrete cells, each separate or confined with respect to adjacent cells, the invention in a broader sense also contemplates establishing less confined evaporative zones. For instance, the invention can be practiced without the use of clearly established cells, as was the case with the FIG. 1 embodiment where trays 16 clearly separate and confine one zone or cell from the next. In FIG. 3, there is shown an evaporator 70 having an outer shell 71 substantially filled with a packing material 72 which may be Raschig rings, Berl saddles or any other suitable packing material. Liquid enters through entrance 74 and residual liquid exits through outlet 76. Because of evaporative action, a liquid-gas interface 78 forms on an incline such that above the interface 78 there prevails a gas phase which consists mainly of vapor. Below the interface the phase 84 consists of liquid and some gas but is described as a liquid phase to distinguish it from the gas phase. The combination prevailing in the liquid phase 84 results in a bubbling or frothing fluid with vapor bubbles forming well below interface 78. Elongated chambers 80 for vapor removal are provided with baffle caps 82 to minimize liquid pickup or entrainment at the chamber entrances.

While there are no partitions to clearly define the evaporative zones, each respective outlet for the chambers 80 exerts a sphere of influence so as to establish the respective evaporative zones. Although these spheres may, tend to overlap, both horizontally and vertically, it can be seen that there still prevails an evaporative zone corresponding to each of the varying elongated columns 80a through 80c. Thus, in describing the relative positions of successive evaporative zones, the term substantially downwardly is intended to encompass the overlapping effect which might prevail in an embodiment such as that shown in FIG. 3. That is, there may be some area, area 83 for illustrative purposes, between elongated chambers 80a and 80b where the influence of the respective chambers is equalized so that vapor formed at this point might travel to either chamber. Nonetheless, it is quite apparent that there are distinct evaporative zones corresponding to the chambers 80a and 80b and that the zone corresponding to 80b is situated in a substantially downwardly direction from the zone established by 80a. Also, the term substantially downwardly contemplates that a zone may be downwardly and laterally displaced from its preceding zone, as is often the case. In viewing FIG. 3, the temperature of the liquid phase 84 passing through the evaporator steadily decreases proceeding downwardly and toward the outlet 76. If isotherms for the liquid temperature were drawn in FIG. 3, they would be substantially horizontal or inclined in such a manner as to intersect with the inclined liquid line 78 proceeding in the direction of the outlet 76. Thus, each of the columns 80 passes through a steadily decreasing temperature gradient corresponding to the steadily decreasing thermal gradient caused by the previously described controlled pressure in the successive evaporative zones.

As indicated above, the phase below interface 78 includes a substantial amount of gas bubbles. These bubbles, it is believed, move toward the interface in the general direction illustrated for bubble 85. Thus, each elongate chamber can be viewed as establishing an evaporative zone extending in a generally lateral manner across substantially the entire evaporator. Such is depicted schematically for zone "b" between the dotted lines on each side of bubble 85.

While the invention has to this point been described in simplified embodiments, with somewhat limited numbers of evaporative zones, the invention contemplates that many zones may be employed within a single evaporator enclosure. Turning to FIGS. 4 and 5, there is shown an evaporator 90 having a liquid inlet 92, a liquid outlet 94 and an outer shell 95. The evaporator includes a plurality of evaporative zones of diminishing pressure. This is provided by disposing elongated chambers, provided as banks of vertical tubes 96a, 96b, and so on, between parallel lengths of sheets members 98 having horizontal corrugations. The corrugated sheet members 98 can be viewed as disposed between adjacent members of each tube bank. For example, referring to FIG. 5, between adjacent tubes of tube bank 96a, there are disposed corrugated sheets 98. Referring to FIG. 4, the corrugated sheets terminate along an inclined edge 100, so that the inclined termination describes an inclined plane proceeding along the banks of tubes in a direction normal to the plane of FIG. 4. Between successive tube banks, for instance between banks 96a and 96b, there is placed a vertical sheet or plate member 97 which extends from the upper inclined edge 100 of corrugated sheet 98 to the top of the evaporator. That is, the sheet members 97 progressively increase in vertical length proceeding from left to right in FIG. 4 and are normal to the plane of the figure. The sheet members 97 serve to isolate the pressure effects of successive elongate chamber tube banks. For instance, sheet 97a isolates the pressure effects of tubes 96a from the lower pressure effect of tubes 96b. Each bank of tubes establishes an evaporative zone starting at the lower edge of the associated sheet member 97. Vapor formed escapes at some point along inclined edge 100 and travels upwardly to the top of tube chamber 96 and is removed downwardly through chamber 96. The corrugated sheet members provide surface area to retard the flow of liquid through the evaporator which facilitates maintaining in the liquid a downwardly decreasing temperature gradient corresponding to that prevailing across the successive evaporative zones.

In the particular arrangement shown in FIG. 4, the tubular elongate vapor chambers 96 are shown as having gradually decreasing lengths proceeding from zone "a" to zone "m." Such, however, is not necessary as, if desired, the tubes could all have the same lengths. This would result in the vapor formed in lower zones having to travel upwardly to the tube entrance a greater distance than the vapor formed in higher zones, which would not seriously hinder the operation of the evaporator.

The tubular elongate chambers 96 are shown passing into a low pressure chamber 102 which operates in the same fashion as chamber 50 in FIG. 2 with separator walls dividing the low pressure chamber into a separate zone for each evaporative zone. The space between the tube bottom wall portions 105 of the tubes 96 are sealed from the chamber 102 by a seal 104 which may be a potting compound or any other suitable means. The top portions 103 of the separator walls are shown in FIG. 4 to depict their positioning.

In FIG. 4, the liquid enters the evaporator and is spread laterally, that is, along a direction normal to the plane of FIG. 4, by inlet chamber 92. The liquid is then spread upon the upper corrugations of corrugated sheet members 98 and flows in a substantially downward manner with some lateral movement in the general direction of the outlet 94. The action of the corrugations restrains and controls the flow of the liquid so that it can assume the desired steadily decreasing downward temperature gradient. As the liquid moves, it continuously bubbles to produce vapor bodies which would move in the general direction indicated by arrow 99. When in the vicinity of corrugation edge 100, the vapor escapes upwardly to enter the tubular elongate chambers 96. Thus, there prevails a liquid-gas interface which roughly corresponds to edge 100. Again, the term "liquid" contemplates a phase containing liquid along with a significant amount of gas.

Upon entering the elongate chambers 96, the vapor is passed downwardly therethrough where it gives up heat to the liquid phase similarly to the general manner described above for the FIG. 1 embodiment. If desired, a cooling chamber of the type shown in FIG. 2 may be incorporated into this arrangement. In such a case, the elongate chamber tubes 96 are lengthened to extend through the chamber in the manner shown in FIG. 2. This combination can be visualized as cutting through the center of the sealant 104 thickness in FIG. 4 and lowering chamber 102 to allow for a cooling chamber similar to chamber 44 in FIG. 2.

The evaporative arrangement in FIG. 4 facilitates achieving a very large number of stages within a single evaporator enclosure. The materials of construction are light and, accordingly, much less expensive than those employed in vessels using trays such as that shown in FIG. 1. This is so especially where there is a low pressure differential between adjacent or successive zones. For instance, in the evaporation of water at subatmospheric pressure, the pressure differential between two zones, for instance, between zones "a" and "b" in FIG. 4, may be as small, as one centimeter of mercury. The separator walls 97 may be fashioned from metal sheet about $\frac{1}{32}$ of an inch in thickness, as can the corrugated sheets 98. The elongate chambers 96 can be fashioned from tubes of even less thickness. For low pressure differential applications, the only portion of the evaporator which need be fashioned from members of substantial strength is the outer shell 95. This results in a considerable economy in fabricating such a unit. Referring to the particular arrangement shown in FIG. 4, there are shown 13 evaporative zones all contained within the single enclosure and providing very highly effective space utilization and economy of construction.

The embodiment shown in FIG. 4 and the embodiments shown in the subsequent figures involve some upward movement of the vapor after escaping the liquid phase and before entering the elongate vapor chambers. This effect also occurs, to some extent, in the FIG. 1 and FIG. 3 embodiments. While some upward movement of the vapor may occur to gain access to the entrance of the elongate vapor chambers, the vapor is considered as being moved from each evaporative zone downwardly through the elongate chambers. Also, while the elongate chambers in the several embodiments shown in the figures are vertical, such is not necessarily intended to limit the invention which contemplates inclined chambers and even nonlinear chambers, such as helical chambers, so long as such serves to move the vapor in a substantially downwardly direction.

The vapor in moving downwardly is passed through, and in heat transfer relation with, at least a portion of the liquid phase having a downwardly decreasing thermal gradient. In many embodiments, the elongate chambers associated with a particular evaporative zone may pass through substantially all that portion of the temperature gradient associated with evaporative zones situated below that particular zone. For instance, elongate chamber 18$b$ in FIG. 1 passes through zones "$c$" and "$d$." In FIG. 4, the elongate chambers 96$g$ pass through substantially all the temperature gradient associated with the subsequent zones "$h$" through "$m$" or at least most of this gradient. Chambers 96$a$ would appear to pass through the entire temperature gradient associated with zones "$b$" through "$m$." However, in some cases, the coolest unevaporated liquid may prevail only near chambers 96$m$ and outlet 94 such that chambers 96$a$ actually pass through a thermal gradient of lesser extent than the entire gradient associated with zones "$b$" through "$m$." Hence, the chambers and the vapor contained therein are described as passing through and in heat transfer relationship with at least a part of that portion of the gradient associated with successive zones or, for many embodiments, through substantially all that portion. Also, it may be determined that for a particular embodiment or arrangement it is desirable to pass the chambers and the vapor contained therein through only a limited part of the thermal gradient or through a limited number of evaporative zones. For example, it may be desirable to pass the chambers through only five or six subsequent zones or through only that corresponding part of the thermal gradient.

In accordance with the FIG. 2 arrangement, some or all of the elongate vapor chambers may, after passing through the desired downward temperature gradient, be additionally passed through a cooling media. In FIG. 2, all the chambers are passed through cooling chamber 44 through which a cooling media such as relatively cold water is circulated via inlet 46 and outlet 48.

If desired, the outlet 94 for unevaporated liquid (FIG. 4) may be moved to the same side as the inlet as is illustrated by the dotted representation on the left side of the evaporator 90. This may, in some cases, enhance the heat exchange effects between the liquid phase and the elongate chambers associated with the earlier evaporation zones, for instance, chambers 96$a$ through $d$ by contacting the chambers with unevaporated liquid at a lower temperature than might be the case where the outlet 94 is on the opposite side. This variation may offer advantages in some of the embodiments having many zones such as the embodiment of FIG. 4 and those embodiments illustrated in the subsequent figures.

A variation of the multizone evaporator arrangement shown in FIG. 4 is illustrated in the embodiment shown in FIGS. 6, 7 and 8. Here the evaporator 110 includes a shell 111 and a series of corrugated sheets 112 which, in configuration and function, are very much like the corrugated sheets 98 in FIG. 4. These sheets are similarly cut along an inclined line 114. Instead of providing flat sheet-like members (97 in FIG. 4) for the upward vapor path, vertically aligned corrugated sheet members 118 are provided. The intersection of sheet 118 with 112 along line 114 can be viewed as a miter effect. Referring to FIG. 7, it can be seen that every other row contains both horizontal corrugated sheets 112 and vertical corrugated sheets 118. The alternating rows contain sheets 120 having the corrugations running vertically throughout the entire length of the evaporator. On each side of corrugated sheet 120 there is situated a comparatively flat sheet 121. Referring to FIG. 8, it can be seen that the comparatively flat sheets 121 cooperate with the corrugations in vertical sheets 120 to provide vertically aligned elongate chambers 123. Similarly, the comparatively flat sheets 121 cooperate with the vertical corrugations in sheets 118 to provide upward elongate chambers 119. The chambers 119 serve to conduct the vapor upwardly to gain access to the upper ends of chambers 123 which pass downwardly through the entire evaporator height.

The upper edges of the corrugated sheets 118 and 120 abut against the upper surface 113 of the evaporator shell which abutment may desirably facilitate a seal. The vertical comparatively flat sheets 121, in some cases, do not run all the way up to the top surface 113 or, if they do, they are provided with holes. Either alternative provides paths for the vapor to move from upwardly conducting chambers 119 across or through sheets 121 and into the downwardly conducting chambers 123. This vapor movement from chambers 119 to 123 is depicted schematically in FIG. 8 by the dotted arrows.

As in the FIG. 4 arrangement, in FIG. 6 liquid enters and is spread laterally by the liquid distribution channel 122. It is then spread upon each side of corrugated sheets 112 as depicted schematically in FIGS. 7 and 7$a$ which show a liquid phase which travels downwardly and along the sheets 112 and collects in pools 115. Some means is provided to permit downward liquid movement which might otherwise be prevented by the intersections of the corrugations in sheets 112 with the vertical comparatively flat sheet members 121. This may be facilitated by providing notches along the corrugation peaks or by fashioning sheets 121 from a material having vertically aligned but comparatively minute corrugations as illustrated in FIG. 8. In a typical embodiment, the peak to peak distance of the corrugations in sheets 112, 118 and 120 might be around three inches whereas the peak to peak distance of the corrugations in sheet 121 would be about $\frac{3}{16}$ inch. Thus, in comparison with corrugated sheets 118 and 120, sheets 121 may be viewed as substantially flat although in fact sheets 121 may have comparatively minute vertical corrugations to facilitate downward liquid flow over the horizontal corrugations on sheets 112. The liquid-vapor phase interface assumes an inclined profile which corresponds generally to line 114. Vapor escapes and moves generally laterally along the spaces above liquid pools 115 till it reaches line 114. It then moves upwardly in upwardly conducting chambers 119. At the top of the upwardly conducting chambers 119, the vapor passes into the top portion of downwardly conducting chambers 123 which carry the vapor downwardly through the entire evaporator length. As the vapor moves below line 114, it is moved in heat transfer relationship, through the surfaces of vertical sheets 121, with the liquid phase on the opposite sides of sheets 121. As the liquid side exhibits a downwardly decreasing temperature gradient, the vapor is cooled as it proceeds downwardly. The pressure control required for the chambers 123 with respect to succeeding evaporative zones can be effected by the provision of separator walls 124 in the same general manner as illustrated in FIG. 2. The chambers 123 are not closed by the bottom of the evaporator although the portions beneath the liquid side are sealed by some suitable means 126 to prevent unevaporated liquid from falling into the low pressure chamber 127. As with the FIG. 4 arrangement, a cooling chamber of the general type shown in FIG. 2 can be situated between the liquid side seal 126 and the low pressure chamber 127. In such a case, sheets 121 and 118 would pass through the cooling chamber and exit into the low pressure chamber 127.

Another multizone evaporator arrangement shown is illustrated in FIGS. 9 and 10 where the evaporative zones are more clearly established than in the FIG. 4 arrangement. This arrangement utilizes flat sheet members in lieu of corrugations and can be viewed as another form of sandwich construction. Referring to FIG. 9, the evaporator 130 includes a shell 131 housing a plurality of parallel vertical sheets 134 which run through the entire height and across the length of the evaporator. The spaces between parallel sheets 134 are spaced alternately with narrow sheet members 136, which are bent to provide an L-shape, and with straight vertical narrow sheet members 138. The L-shaped sheets constitute the liquid-bearing portion and the vertical sheets 138 establish a plurality of elongate vapor chambers 139 which run through the entire height of the evaporator. The L-shaped members 136 have progressively longer legs proceeding from top to bottom and left to right in FIGS. 9 and 10. The apexes of the L-shaped members 136 describe an inclined profile 140 similar to that provided by the edge 100 of corrugated sheet member 98 in FIG. 4.

The horizontal leg 142 of the L-shaped member 136 holds a body of water 143 and establishes an evaporative zone 145. Vapor travels across the zone 145 and upwardly along associated chamber 144. After reaching the top of chamber 144, it passes through holes 154 in sheets 134 so that it can enter the downwardly extending vapor chambers 139. While the holes are shown as provided at the top of the evaporator, such is not absolutely necessary. The holes 154 may, if desired, be provided only a short distance above the level of liquid 143 for each particular zone. For instance, hole 155 may be only a short distance above the liquid level shown for evaporative zone "i." However, locating all the holes near the top offers a convenience in fabrication and may prevent the occurrence of dead gas pockets above the holes.

In FIG. 9, liquid enters and is spread laterally across the evaporator by liquid inlet channel 150 wherefrom it enters the upper evaporative stages. In the particular arrangement shown, it enters the first five stages, stages "a" through "e." It then passes in a generally downwardly direction to the subsequent stages utilizing notches 152 or any other suitable means for permitting controlled passage downwardly from stage to stage. The notches 152 at the intersection with sheets 134 are highly suitable for this purpose since such facilitates falling film movement of the liquid on the liquid side of sheets 134, thus permitting the utilization of the heat transfer advantages associated with falling film flow. The unevaporated liquid is collected and removed in the same manner depicted in the previously discussed arrangement. As with the arrangements described above, some provision for further condensation may be made such as that illustrated in FIGS. 1 or 2. The pressure regulation for the respective evaporative zones is likewise accomplished in the manner described in connection with the previously discussed arrangements.

In an apparatus sense, the invention contemplates an evaporator having a plurality of evaporative zones, each situated in a generally downward direction from preceding zones, and associated downwardly extending elongated vapor removal chambers. The chambers may decrease in length proceeding from one zone to the next and serve to establish each of the respective zones. The chambers normally pass through substantially all the succeeding evaporative zones although there may be some cases where they extend through only a portion of those zones. In addition, some means is provided for controlling the pressure in the elongated chambers so as to establish the desired pressure levels in the various evaporative zones. Suitable means include a separate low pressure source for each pressure level or a common low pressure source with pressure drop means of succeeding arrangement to vary the pressure from zone to zone as described above.

On the liquid side, that is, on the outside of the elongate chambers, some means is provided to control and restrict the flow of the liquid downwardly and laterally so as to maintain a steadily decreasing temperature gradient proceeding downwardly through the unevaporated liquid. The simplest means for accomplishing such is included in the embodiment shown in FIG. 3. In this embodiment, the packing restricts the liquid flow so that the liquid assumes a downwardly decreasing temperature gradient corresponding to the downwardly decreasing temperature gradient of the successive evaporative zones. In the FIG. 1 embodiment, the evaporative zones are clearly separate, in the form of confined cells established by the trays 16. The liquid has a temperature gradient which can be viewed as the same as that for the evaporative zones and is moved from zone to zone downwardly along the outside of the chambers 18.

As shown in FIG. 2, the elongate chambers, after exiting the evaporator enclosure, can be passed further downwardly through a cooled chamber or enclosure 44 where a cooling medium is circulated around the outside to effect further vapor condensation inside these chambers. To be completely effective, the temperature of the cooling medium should be less than that of the last evaporative stage.

To further illustrate the invention, the following examples proceed.

EXAMPLE 1

A column having an inside diameter of approximately 3¾ inches was packed with gravel and provided with 12⅜ inch diameter tubes to provide a configuration of the type shown in FIG. 3. The tubes were provided with cap-like baffles to minimize liquid entrainment. The column was 28 inches high and the tubes were grouped into four banks of three tubes each, each bank being progressively shorter than the preceding bank. That is, referring to FIG. 3, the example included four banks of tubes rather than the three shown in FIG. 3 and each bank contained three tubes disposed along a plane in a direction perpendicular to the plane of FIG. 3. Water was fed into and removed from the column, the respective water inlet and outlet temperatures together with the water rate being indicated in Table I along with the feed rate for several runs. The rate of condensate recovered is also shown along with a performance ratio which is the actual yield divided by the yield for an ideal single stage process calculated from the feed water rate and the temperature drop of the feed water assuming that all of the heat loss reflected in the temperature drop is recovered in the vapor. It becomes apparent in viewing Table I, referring to the performance ratio, that the practice of the invention provides condensate yields varying from over 50% greater to over 100% greater than an ideal single stage process. This obviously results in a considerable savings in comparison to the use of a surface condenser to recover all the condensate.

EXAMPLE 2

A column 28 inches high and approximately 3¾ inches in internal diameter was provided with trays and ⅜ inch diameter tubes to serve as elongate vapor chambers 18 in accordance with the embodiment shown in FIG. 1. In this case, there were three evaporative zones each containing four tubes and a total of 12 tubes. Several runs were made using water as the feed and the same measurements and data were taken as in Example 1. Referring to Table I, the results again indicate a very substantial improvement compared with an ideal single stage evaporator.

EXAMPLE 3

A column similar to that described in Example 2 was constructed although the length this time was 7 feet and it was divided into five stages each containing three tubes. The tubes were again ⅜ inch in diameter and the column had an internal diameter of 3¾ inches. The results of two runs are tabulated in Table I where it is again apparent that very good performance ratios are obtained with rather high feed rates and small temperature differentials between inlet and outlet streams.

TABLE I.—RESULTS OF TESTS WITH 3.75 INCH DIAMETER COLUMNS

| Feed water rate, ml./min. | Feed water temperature In, °F. | Out, °F. | Condensate, ml./min. | (1) Performance ratio |
|---|---|---|---|---|
| Example 1: | | | | |
| 4,800 | 108.0 | 105.2 | 28.7 | 2.21 |
| 3,900 | 109.5 | 106.0 | 21.4 | 1.62 |
| 2,450 | 109.7 | 103.6 | 22.3 | 1.54 |
| 2,700 | 119.4 | 111.6 | 32.8 | 1.60 |
| 2,400 | 103.9 | 99.1 | 17.5 | 1.58 |
| Example 2: | | | | |
| 4,600 | 109.4 | 103.2 | 44.0 | 1.60 |
| 3,200 | 108.7 | 100.1 | 41.4 | 1.56 |
| 2,400 | 109.7 | 96.8 | 45.6 | 1.52 |
| 1,550 | 109.5 | 92.9 | 34.6 | 1.39 |
| 900 | 109.8 | 89.3 | 23.0 | 1.29 |
| Example 3: | | | | |
| 6,810 | 109.5 | 101.5 | 100.2 | 1.91 |
| 7,000 | 109.5 | 101.6 | 88.5 | 1.66 |

EXAMPLE 4

Another column was constructed having a diameter of 15 inches and a height of 10 feet. It was divided into five chambers and the overall arrangement was substantially that shown in FIG. 1. Each chamber included twelve ¾ inch tubes, for a column total of 60, which functioned as elongate chambers 18. Evaporator runs similar to those made in connection with the previous examples were performed although the flow rate was greatly increased because of the use of a much larger evaporator. In viewing Table II, it is quite apparent that the high performance ratios achieved with the smaller evaporators of the previous examples are still easily maintained in this much larger unit.

EXAMPLE 5

The evaporator described in Example 4 was modified by plugging the twelve elongate chamber vapor exit tubes from the fifth zone and also by sealing the chamber of the fifth zone from that of the fourth. The unevaporated water outlet was taken from the fourth zone. The chamber of the fifth zone was connected to a cooling water supply so that it could now function as the condenser along the lines shown in FIG. 2. In this arrangement, the condenser 38 in FIG. 1 is eliminated so that all the condensation occurs within the elongate chambers which is assured by the fact that the fifth zone chamber now functions as the condenser. The results are set out in Table II where it is apparent that high performance ratios, similar to those of the Example 4 arrangement, are achieved although the condensate rate is lower because of the eliminated fifth zone. There is a compensating advantage in the Example 5 arrangement in that all the evaporation and condensation is effected within a single compact enclosure.

TABLE II.—FIVE COMPARTMENTS—WITH SEPARATE CONDENSER

[15" dia., 10' high, 60¾" tubes]

| Feed water rate, gal./min. | Feed Water Temperature In, °F. | Out, °F. | Condensate rate, gal./min. | Performance ratio |
|---|---|---|---|---|
| Example 4: | | | | |
| 50 | 99.5 | 88.0 | 1.12 | 2.03 |
| 50 | 98.0 | 90.0 | 0.70 | 1.83 |
| 50 | 104.0 | 88.0 | 1.45 | 1.89 |
| 50 | 101.0 | 87.0 | 1.31 | 1.95 |
| 50 | 98.5 | 86.0 | 1.18 | 1.97 |
| Example 5: | | | | |
| 49 | 103.0 | 97.5 | 0.409 | 1.58 |
| 49 | 101.0 | 95.0 | 0.446 | 1.58 |
| 49 | 101.0 | 96.5 | 0.337 | 1.59 |
| 51 | 115.5 | 105.0 | 0.744 | 1.43 |
| 51 | 110.0 | 105.0 | 0.397 | 1.61 |
| 51 | 105.5 | 101.0 | 0.370 | 1.71 |
| 49 | 121.5 | 112.0 | 0.679 | 1.50 |

It is quite apparent that the invention provides arrangements for improving evaporation efficiency and space utilization which arrangements are especially useful for purifying water utilizing small temperature differentials.

While the invention has been described with particular reference to certain arrangements, it is not necessarily limited to such. It is intended that the claims encompass the true spirit and scope of the invention.

What is claimed is:

1. In an evaporative process wherein a portion of feed liquid containing impurities is evaporated and the resulting vapor condensed to provide a liquid product containing less impurities and wherein the feed liquid enters the evaporative process at an inlet temperature higher than the outlet temperature of the unevaporated portion thereof, the steps comprising:

(1) passing feed liquid through a plurality of evaporative zones, each zone being situated in a substantially downwardly direction from the preceding zone, (2) evaporating a portion of said liquid in each evaporative zone by maintaining in each zone a pressure which promotes evaporation thereof and produces both a vapor and an unevaporated portion of said liquid at a reduced temperature, (3) maintaining said pressures in successive evaporative zones at decreasing pressure levels to produce and maintain a downwardly decreasing pressure gradient through successive zones while conducting the flow of unevaporated liquid through said successive zones in such a manner as to establish and maintain in said liquid, in response to said pressure gradient, a substantially downwardly decreasing temperature gradient, the said pressure gradient and said temperature gradient both proceeding in a substantially downwardly direction, and (4) for at least a plurality of evaporative zones, passing vapor produced in a given evaporative zone downwardly within at least one elongate chamber and maintaining the pressure within said elongate chamber to maintain said given evaporative zone and the pressure therein, said elongate chamber passing from said given evaporative zone downwardly through at least a substantial part of that portion of said decreasing liquid temperature gradient which corresponds to a plurality of the evaporative zones successive to and lower than said given evaporative zone and in heat transfer relationship with the unevaporated liquid in said successive and lower zones thereby to induce condensation from said vapor in said elongate chamber.

2. The method according to claim 1 wherein the elongate vapor chambers are substantially vertical.

3. The method according to claim 1 wherein the elongate vapor chambers from at least one of said evaporative zones pass through substantially all that portion of said temperature gradient which corresponds to zones successive to and lower than that zone.

4. The method according to claim 1 wherein the elongate vapor chambers from at least one evaporative zone pass through substantially all zones successive to and lower than said zone.

5. The method according to claim 1 wherein the elongate vapor chambers from at least one evaporative zone pass through less than all that portion of said temperature gradient which corresponds to evaporative zones successive to and lower than that zone.

6. The method according to claim 1 wherein the vapor after passing through said downwardly decreasing temperature gradient is additionally moved through and in heat transfer relation with a cooling media thereby to effect further condensation from said vapor.

7. An apparatus for evaporating a liquid and condensing a portion of the vapor thereby produced comprising:
  (1) means to provide, in a single enclosure, a plurality of evaporative zones, each successive zone being situated in a substantially downwardly direction from the zone preceding,
  (2) downwardly extending elongate vapor chamber means arranged to conduct vapor downwardly from each evaporative zone,
  (3) means to maintain the pressure in the elongate vapor chamber means so as to maintain pressure in successive evaporating zones at substantially steadily downwardly decreasing levels to establish a downward pressure gradient,
  (4) means to pass incoming liquid through said enclosure and through a plurality of said zones,
  (5) means to conduct movement of liquid through said enclosure such that the liquid moves progressively through a plurality of said zones and in heat transfer relation with said elongate chambers and such that the liquid exhibits, in association with said downward pressure gradient, a substantially steadily downwardly decreasing temperature gradient.

8. The apparatus according to claim 7 wherein the elongate vapor chamber means passing downwardly from each evaporative zone passes through substantially all succeeding evaporative zones.

9. An apparatus according to claim 7 wherein the elongate vapor chamber means, after passing through the final evaporative zone, passes through a cooling chamber adapted for circulating therethrough a coolant on the outside of said elongate chambers.

10. The method according to claim 1 wherein the feed liquid is brackish water and the condensed liquid product is purified water.

References Cited

UNITED STATES PATENTS

| | | | |
|---|---|---|---|
| 2,944,966 | 7/1960 | Eickmeyer | 261—112X |
| 3,227,630 | 1/1966 | Beckman | 159—13B |

WILBUR L. BASCOMB, Jr., Primary Examiner

D. EDWARDS, Assistant Examiner

U.S. Cl. X.R.

203—91, 89, 73; 202—174, 235, 236; 159—18